Sept. 22, 1964  P. D. GREEN ETAL  3,149,751
BEVERAGE DISPENSING MACHINES

Filed Nov. 25, 1960  3 Sheets-Sheet 1

INVENTORS
PETER DYKE GREEN
RONALD BUSH-NELSON
BY
ATTORNEYS

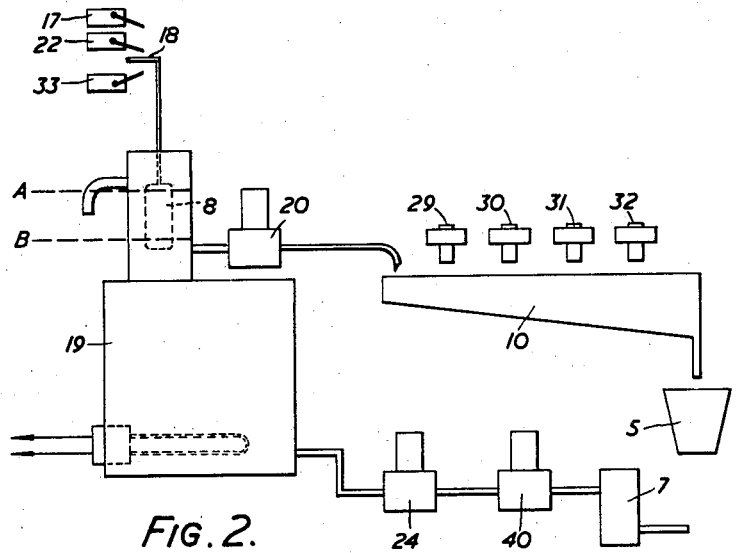
FIG. 2.
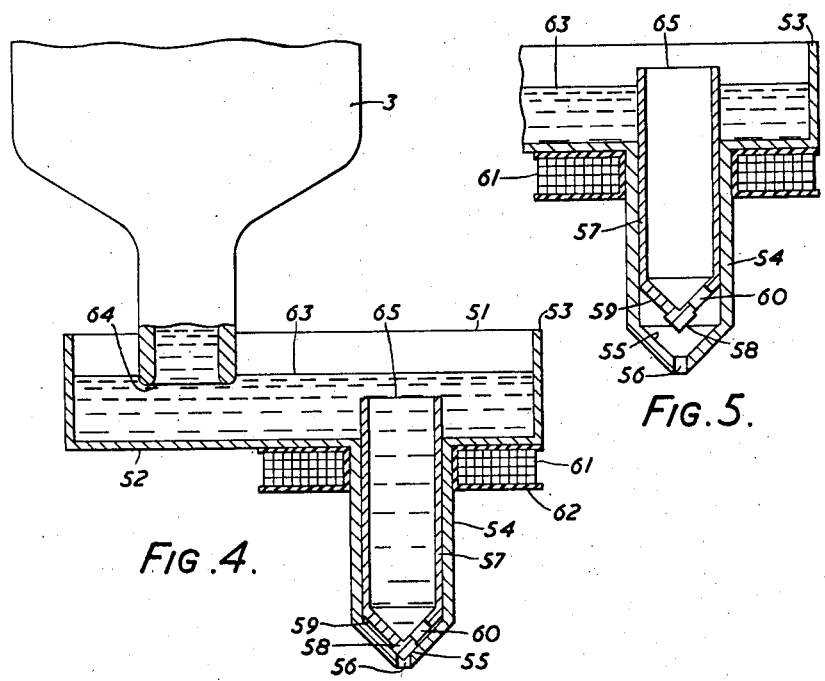
FIG. 4.
FIG. 5.

INVENTORS
PETER DYKE GREEN
RONALD BUSH-NELSON
BY
Hane and Nydick
ATTORNEYS

United States Patent Office 3,149,751
Patented Sept. 22, 1964

3,149,751
BEVERAGE DISPENSING MACHINES
Peter Dyke Green, London, and Ronald Bush-Nelson, Croydon, England, assignors to The Gloster Aircraft Company Limited
Filed Nov. 25, 1960, Ser. No. 71,483
Claims priority, application Great Britain Nov. 27, 1959
14 Claims. (Cl. 222—2)

The present invention relates to a beverage dispensing machine for dispensing a hot or cold beverage made from a base medium and at least one added ingredient. The beverage may be a hot drink such as tea. coffee or the like, or a cold drink such as fruit squash. The base medium may be water and the ingredient may be a liquid concentrate.

In previously proposed beverage dispensing machines, the sequence and timing of the successive operations required to prepare the hot or cold drink is controlled by a "programme" mechanism driven by an electric motor, which controls the various operations and ensures that they are carried out in the correct order and at the appropriate intervals. An object of the present invention is to provide a dispensing machine which does not require a motor driven programme mechanism but in which the steps may nevertheless be correctly controlled as to timing, sequence and duration.

The invention provides a beverage dispensing machine for dispensing a hot or cold beverage made from a base medium and at least one added ingredient, comprising a container for the base medium, a valve-controlled inlet to the container for conveying base medium from a supply to the container, a valve-controlled outlet from the container for conveying base medium from the container to a drinking vessel, at least one ingredient dispensing device for dispensing ingredient to the drinking vessel, consumer-operable means for initiating operation of the machine by opening the container outlet valve, a float positioned in accordance with the level of base medium in the container, and switching means operable by a change in position of the float, operation of the switching means in response to a fall in the level of base medium in the container after the container outlet valve has been opened being adapted to operate the ingredient dispensing device to dispense a predetermined quantity of ingredient and also to both close the container outlet valve and open the container inlet valve when sufficient base medium and ingredient have been dispensed to the drinking vessel, operation of the switching means in response to a rise in level of base medium being adapted to restore the machine to its unoperated condition.

Although not restricted thereto, the invention is particularly applicable to automatic coin-operated vending machines in which the consumer-operable means for initiating operation of the machine includes a switch controlled to a coin-selector in response to insertion of the appropriate coin or coins into the machine. There may be a choice of ingredients, determined by the setting of a selector switch by the consumer. The ingredient dispensing device or devices when used with a liquid ingredient may be of a novel electrically-actuated form, described below, having a very simple construction in which the quantity of liquid dispensed is nevertheless accurately controlled.

In order that the invention may be clearly understood, one embodiment thereof will now be described by way of example only with reference to the accompanying drawings, in which:

FIGURE 2 is a simplified diagram of parts of the machine shown in FIGURE 1 illustrating the float operation and water flow from supply to cup;

FIGURE 4 is a part-sectional elevation of one form of liquid ingredient dispensing device; and FIGURE 5 is a sectional elevation of part of the dispensing device shown in FIGURE 4 with the valve in its raised position.

Figure 1:
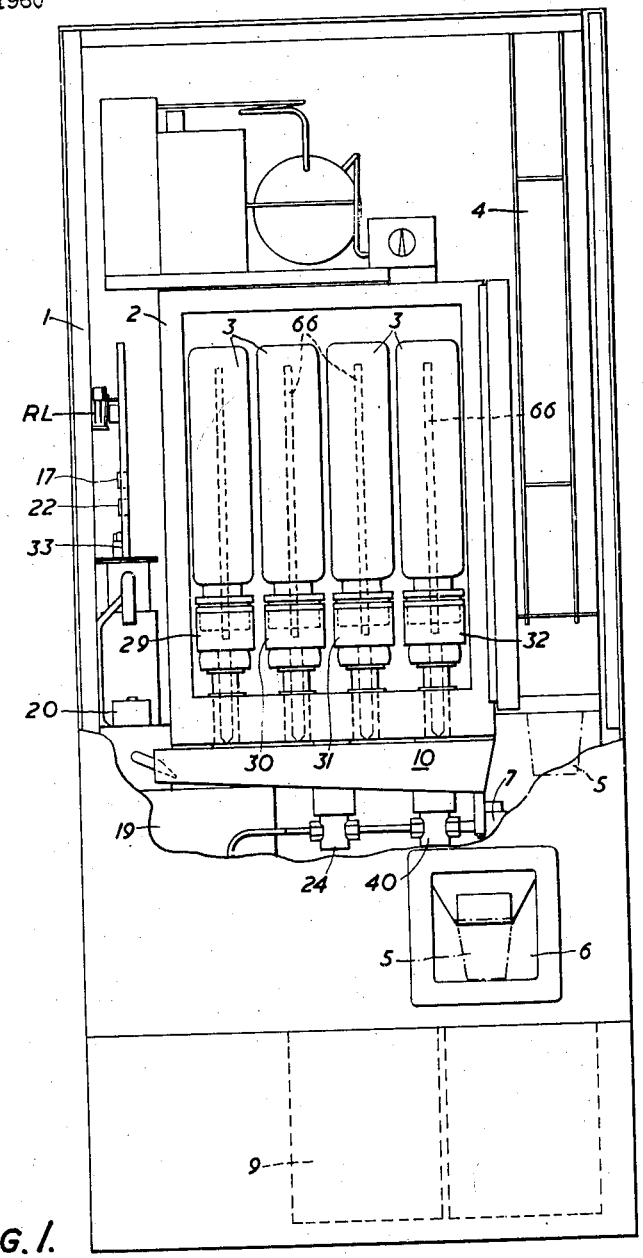
FIGURE 1 is a front view of the machine with the upper part of the door broken away to show the interior.

The embodiment of machine shown in the drawings is an automatic coin-operated vending machine for hot drinks such as tea or coffee. FIGURE 1 shows the general lay-out of the interior of the machine and will be only broadly described since many parts such as the cup dispenser, refrigeration mechanism and coin-actuated mechanism for closing an electrical circuit controlling the dispensing operation, are already well known. Parts particularly relevant to the present invention are described subsequently with reference to FIGURES 2 and 3.

Referring now to FIGURE 1, the cabinet 1 of the machine houses in its upper part refrigeration apparatus of well-known type for cooling the interior of a heat-insulated compartment 2 in which are located containers 3 for concentrated liquid ingredients. Alongside the compartment 2 runs a vertical cup retainer 4 for a stack of cups 5. The cup retainer 4 forms part of a cup dispenser which can take any one of a number of known forms each of which allows a cup to be released and fall down a chute to a vending position opposite an opening 6 in the door of the cabinet 1 so as to be accessible to a consumer upon the completion of a vending operation. Attached to the upper part of the door (not shown in FIGURE 1) are a coin slot and associated coin mechanism, and also a selector switch operable by the consumer to select the ingredients to be added to the base medium, which is in this case water; these parts of the machine are further described subsequently with reference to FIGURE 3.

The water is drawn from an external supply and passes (see also FIGURES 2 and 3) through a filter 7 incorporating a non-return valve, an electromagnetic master cold-water valve 40 and a further electromagnetic cold-water valve 24 to a water container or tank 19 provided with an immersion heater and thermostat. The tank 19 is open to the atmosphere and a float 8 (FIGURE 2) is positioned in accordance with the level of water in the tank; this varies between level A at the commencement of a vending cycle and level B when enough water has been dispensed (approx. 6 fluid ounces) to supply beverage for a single cup. Float arm 18 attached to float 8 is arranged to operate three switches 17, 22 and 33 during passage of the float 8 between water levels A and B, as described later. Water level A is immediately beneath an overflow pipe leading to a waste can 9 (FIGURE 1) at the bottom of the cabinet 1, while water level B is above an outlet from tank 19 leading through hot water outlet valve 20 to a point above one end of a sloping trough 10 of V-section in which the water may be mixed with ingredient from one or more of the containers 3, which are provided with dispensing devices 29, 30, 31, 32 located above the trough 10. An outlet at the lower end of the trough allows the water and ingredient to flow into a cup 5 previously positioned opposite the opening 6 in the door of the cabinet 1.

Figure 3:
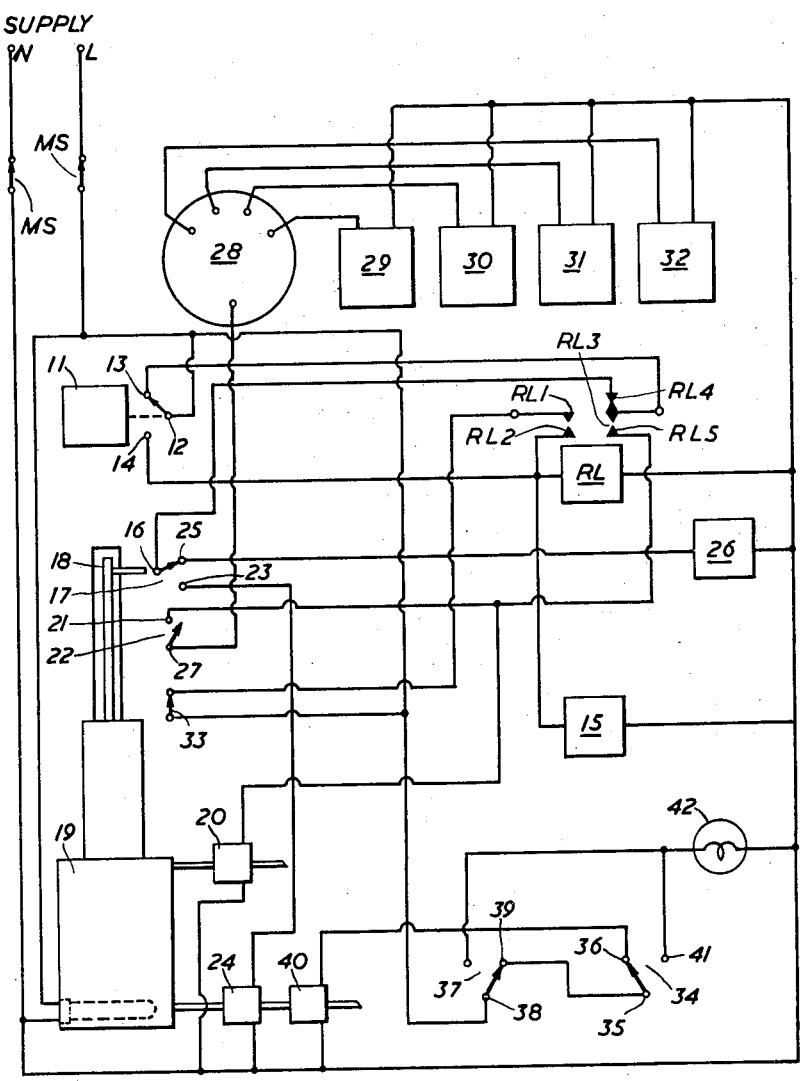
FIGURE 3 is a circuit diagram of the machine with its component elements in the positions they occupy at the commencement of a dispensing cycle.

Referring now to FIGURE 3, the elements comprised in the apparatus are shown in the positions they occupy when the machine is ready to accept a coin, that is, at the commencement of a serving and vending cycle. In this condition the main supply switch MS is closed and current is being supplied from the live main L to the immersion heater in the hot water tank 19 to maintain a supply of water at the desired temperature for hot drinks.

If the machine is to supply cold drinks the immersion heater may be separately switched out of circuit or there may be a separate cold water tank. Current is also supplied through contacts 12 and 13, RL.3 and RL.4, and 16 and 25, to an electromagnetic coin-block device 26 which will only permit the insertion of a coin when it is energised. The machine will accordingly refuse to accept a coin when it is switched off or in case of a failure of the electric supply. Current is further supplied through contacts 38 and 39, and 35 and 36, to the electromagnetic master cold water valve 40, which will only permit water to flow when it is energised. All the elements mentioned, and those mentioned hereinafter, are provided with a return wire connected to the neutral line L.

When a coin is inserted it operates a coin-selector 11, which may be of conventional type, and the latter operates the moving contact 12 of a changeover switch from contact 13 to contact 14. Breaking contact 13 de-energises the coin-block device 26, so that the machine will refuse to accept a further coin, and making contact 14 energizes the solenoid of a relay RL, which operates and also energises the electromagnetic cup dispenser 15, which feeds a cup 5 to the dispensing station opopsite the opening 6 (FIGURE 1). Operation of relay RL closes a relay holding circuit through contacts RL.1 and RL.2, and switch 33, so that the relay solenoid is now self-energised, and changes over the moving contact RL.3 from RL.4 to RL.5.

The coin-operated switch is returned to its original position, but it is desirable to introduce a momentary delay, to allow the cup to settle in its position in the dispensing station, and this may be arranged by providing a catch to hold the contact 12 until the coin has travelled to the end of a chute in the selector mechanism, where it operates a trip lever or wire before falling into the coin receptacle. The trip lever allows contact 12 to break from contact 14 and re-make with 13. Breaking 14 has no effect since the current is maintained through switch 33 and holding contacts RL.1 and RL.2. Making 13 energises hot water valve 20 through contacts RL.4 and RL.5 to open the valve and allow hot water to flow into the cup 5 from the hot water tank 19. Float arm 18, attached to float 8 in the tank, begins to sink and immediately after starting its movement, engages the moving contact 16 of changeover switch 17 and operates it from contact 25 to contact 23. This has no immediate effect because contact RL.3, connected to contact 16, was disengaged when the relay operated.

Further movement o fthe float arm 18 operates switch 22 which closes, of which one contact, 21, is connected through contacts RL.5 and RL.4, and 13 and 12, to the line conductor L of the supply. The other contact 27 of switch 22 is connected to the selector switch 28 by means of which the person operating the machine may select the particular form of beverage he requires, for example, tea only, tea with milk, or tea with milk and sugar. The switch 28 may have as many contacts as desired, four being illustrated, and these are connected to the dispensing devices 29, 30, 31 and 32 which, when energised, dispense the appropriate quantity of the selected ingredient.

Hot water continues to discharge into the cup, thus thoroughly mixing up the ingredient or ingredients introduced by the dispensing devices, until the float arm operates switch 33, which opens. By this time the required amount of hot water has been delivered. Switch 33 is in the relay holding circuit and opening it de-energises the relay coil RL and the cup dispenser 15, which resets itself, in readiness to deliver the next cup. The relay contacts return to their initial positions (as shown on the drawing), so that the hot water valve 20 is de-energised and closes, and the selector switch 28 is de-energised. Simultaneously cold water valve 24 is energised through contacts 23 and 16, RL.4 and RL.3 and 13 and 12, which opens to admit cold water to the tank 19.

The float 8 now begins to rise, carrying the float arm 18 with it. Switch 33 is re-closed but, since contact RL.1 has been disengaged by the release of the relay, this has no effect. Switch 22 is next re-opened but since contact RL.5 is disengaged this also has no effect. Finally, when the tank has been completely refilled, the switch 17 is changed back. Contact 23 is disengaged, so de-energising the cold water valve 24, which closes. Contact 25 is engaged and the coin-block device 26 is energised, so that another coin will be accepted. The apparatus is now reset to its initial condition.

The machine includes two safety devices which prevent liquid overflow. The first comprises a switch 34 which is a changeover switch in which contacts 35 and 36 are normally connected and the second is a further changeover switch 37 in which contacts 38 and 39 are normally connected. When the machine is functioning normally the current flows from the mains through contacts 38 and 39, and through contacts 35 and 36 to the master cold water valve 40 hydraulically connected in series with the inlet valve 24. The valve 40 is thus continuously held open. If the machine runs short of cups, the removal of, say, the last cup but two, actuates the switch 34 so that contact 36 is disconnected. The cold water valve 40 is closed and no cold water can pass through the valve 24 into the hot water tank. At the same time contact 41 is connected to contact 35 and this completes the circuit through a lamp 42 which illuminates an "empty" sign.

The second safety device is controlled by the switch 37 which is associated with the waste can 9. If the liquid level in this waste can rises above a predetermined point a float actuates the switch 37, thus disconnecting contact 39. The current to the cold water valve 40 is thereby cut off and consequence the flow of water to the valve 24 is cut off. At the same time contact 43 is connected and this also completes the circuit through the "empty" lamp 42.

It will be observed that if circumstances arise in which the "empty" sign is illuminated the machine is still in operational condition, with the coin-block device energised. The same condtion would occur in case of failure of the cold water supply, except that the "empty" sign would not be illuminated. In either case, insertion of a coin will cause the machine to supply the desired beverage but when this operation has been completed the float remains in its lower position, so that the coin-block device is conditioned to prevent the insertion of further coins.

In a modification of this circuit arrangement, the switches 34 and 37 are included in the circuit from the live main L to moving contact 12 of the changeover switch associated with coin-selector 11. In this arrangement, the machine is automatically prevented from vending when the waste tank is full or the stack of dispensable cups is exhausted, since under either of these conditions both the master cold water valve 40 is closed and also the coin-block device 26 is de-energised to prevent coins being inserted in the machine. Again, the circuit may readily be modified by the addition of extra relays and if necessary extra coin selectors and coin-block devices to allow the machine to dispense beverages at different prices, e.g. tea at 3d a cup and coffee at 4d a cup; such modifications will not be described here since they form no part of the present invention and are well within the competence of those skilled in the art.

The liquid dispensing devices 29, 30, 31 and 32, here used for dispensing predetermined quantities of liquid ingredients into the mixing trough 10, are themselves of a novel constructon and one particular form which each dispensing device may take is illustrated in FIGURES 4 and 5. Referring now to these figures, the device comprises a trough 51 which may be composed of a rectangular bottom 52 and vertical sides 53. Towards one end of the trough a hollow valve body 54 made of non-magnetic material is attached to or is integral with the bottom 52 of the trough and projects downwardly therefrom. Near the lower end of the valve body 54 a seating 55 is formed which, in the drawing, is in the form of a hollow cone. It will, however, be understood that this particular form is not essential and that a flat valve seating may be employed, or the valve may be in the form of a sleeve valve. At the bottom end of the valve body 54 is an opening 56 to allow liquid to escape when the valve is open.

Inside the valve body 54 is a hollow valve composed of a cylindrical portion 57 and a lower conical portion, the end of which is formed to a valve surface 58 adapted to co-operate with the valve seat 55. Above the valve surface 58 the conical portion of the valve is relieved at 59 and a passage 60 is formed in the wall of the portion 59. The hollow valve 57 is made of a magnetic material and its size is such that its internal volume is substantially equal to the amount of liquid which it is desired to dispense at each actuation.

Actuation of the dispensing device is provided by a solenoid consisting of a wire winding 61 on a bobbin 62 which is placed around the valve body 54 at its upper end, immediately below the bottom 52 of the trough.

The ingredient container 3 is supported in an inverted position above the part of the trough 51 opposite the valve body 54. When the container is first inverted to the position shown liquid flows from it until the level 63 rises to the level of the bottom edge 64 of the container. After this an airlock forms and the liquid is prevented from rising above the level 64 by more than a small amount, the remainder of the liquid in the container 3 being supported by atmospheric presure.

The parts are so arranged that the upper edge 65 of the valve is below the surface 63 of the liquid when the valve is in its lower position, and seated, so that no liquid can flow through the opening 56. When it is desired to dispense liquid the dispenser is actuated by energisation of the winding 61, so that the magnetic field set-up draws the valve upwardly until its upper edge 65 is above the liquid level 63, as is clearly shown in FIGURE 5. The liquid contained in the valve then passes through the opening 60 into the valve body 54 and out through the passage 56. When the whole of the liquid contained in the valve has drained through the passage 56 the flow ceases. When the winding 61 is de-energised the valve falls by its own weight, and immediately the upper edge 65 falls below the surface 63 of the liquid, a quantity of liquid pours into the valve, the added weight of the liquid hastening the movement of the valve to its lower position in which the valve is closed. The upward and downward movement of the valve is rapid, so that the quantity of the liquid dispensed at each actuation is substantially equal to the volume contained in the valve.

When, after actuation, the valve is refilled with fresh liquid, the level 63 falls until it is slightly below the level 64 of the container opening, when air is permitted to enter the container 3. This releases liquid from the container until the level 63 again rises to, or slightly above, the level 64, when the airlock is re-established. By this means the level 63 is maintained substantially constant until the whole of the liquid in the container has been decanted into the trough 51.

Various modifications to this form of dispensing device are possible. In particular, it is somewhat inconvenient to have to invert an open container 3 without losing an appreciable quantity of ingredient, and to avoid this inconvenience the container may be provided with a valve-controlled closure. This closure may for example include an abutment rod indicated at 66 in FIGURE 1, which abuts the bottom 52 of the trough 51 when the container 3 is placed in position, displacing the valve-cap inwardly against a spring-bias and thus opening the mouth of the container. Again, using the same valve body 54 and opening 56, the necessity of having a valve surface 58 adapted to cooperate in liquid-tight fashion with the valve seat 55 can be avoided by providing a grommet or rubber ring seated in a groove in the lower conical portion of the hollow valve between its extreme end, directly opposite the opening 56, and the passage 60; in this case, the passage 60 itself can be replaced by two wider diametrically opposite passages located at the shoulder of the hollow valve where the cylindrical portion 57 meets the lower conical portion.

It will be seen that the machine of the present invention does not require a motor driven progamme mechanism, the timing of the various steps necessary to the dispensing operation being controlled generally by switching means in accordance with the level of base medium in a container. The fact that the container—in the above example, the water tank 19—can be open to atmosphere is also advantageous where regulations are in force requiring special precautions in the case of pressurised water containers connected to a main water supply. Finally, the machine is simple and reliable and yet always "fails safe", refusing to accept a coin unless it is in a position to carry out the required service in return for the coin.

We claim:

1. A beverage-dispensing machine for dispensing a beverage made from a base medium and at least one added ingredient, said machine comprising a container for the base medium, an inlet duct connected to the container for conveying base medium from a supply to the container, a switch-operated inlet control valve for controlling the flow of medium through said duct, an outlet duct connected to the container for conveying base medium from the container to a drinking vessel, a switch-operated outlet control valve for controlling the flow of medium through said outlet duct, at least one switch-operated ingredient-dispensing device for dispensing an ingredient to the drinking vessel, switch means for controlling said dispensing device, consumer-operable means for initiating operation of the machine by opening said container outlet control valve, a float floating on base medium in the container for positioning said float in accordance with the level of base medium in the container, said float including switch control means, and control circuit means including several switching means sequentially operable by said switch control means due to a change in the position of the float as caused by a fall of the level of the base medium, said switching means controlling said dispensing device and said control valves; sequential operation of the switching means in response to a fall in the level of base medium in the container after the container outlet control valve has been opened causing said control circuit means to effect successive operation of the ingredient-dispensing device to dispense a predetermined quantity of ingredient, closing the container outlet control valve and opening the container inlet control valve when sufficient base medium and ingredient have been dispensed to the drinking vessel; sequential operation of the switching means in response to a rise in the level of base medium due to the opening of said inlet control valve restoring the machine to its initial condition.

2. A beverage dispensing machine according to claim 1, wherein said several switching means comprise a plurality of switches operated by said switch control means in sequence in response to a fall of the float due to a fall in the level of base medium and returned to their unoperated condition in opposite sequence in response to a rise of the float due to a rise in the level of base medium.

3. A beverage-dispensing machine for dispensing a beverage made from a base medium and at least one added ingredient, said machine comprising a container for the base medium, an inlet duct connected to the container for conveying base medium from a supply to the container, a switch-operated inlet control valve included in said duct for controlling the flow of medium therethrough, an outlet duct connected to the container for conveying base medium from the container to a drinking vessel, a switch-operated outlet control valve included in said outlet duct for controlling the flow of medium therethrough at least one switch-operated ingredient-dispensing device for dispensing the ingredient to the drinking vessel, switch means for controlling said dispensing device, consumer-operable means for dispensing the ingredient to the drinking vessel, consumer-operable means for initiating operation of the machine by opening the container outlet control valve, a float floating on base medium in the container for positioning the float in accordance with the level of the base medium in the container, said float including switch control means, first, second, and third switches for operating the dispensing machine operated by engagement with said switch control means in sequence in response to a fall of the float due to a decrease in the level of base medium and returned to their unoperated condition in reversed sequence in response to a rise of the float due to a rise in the level of base medium to restore the dispensing machine to its original condition, control circuit means including an electromagnetic relay and controlling said control valves, said consumer-operable means operating said electromagnetic relay, a holding circuit including the third switch, said holding circuit being activated by operation of said relay and holding the same operated, operation of the relay in the control circuit means causing opening the container outlet control valve and allowing the second switch when operated by the float to operate the ingredient-dispensing device, release of the relay by opening of the third switch by the float closing the container outlet control valve, thereby discontinuing operation of the ingredient-dispensing device when sufficient base medium and ingredient have been dispensed to the drinking vessel, and opening the container inlet control valve while the first switch remains operated.

4. A beverage dispensing machine according to claim 3 and adapted to be coin-operated, comprising a coin selector and wherein the consumer-operable means for initiating operation of the machine includes a switch controlled by said coin-selector in response to insertion of the appropriate coin value into the machine.

5. A beverage dispensing machine according to claim 4, wherein said switch included in the consumer-operable means operates the electromagnetic relay upon acceptance of the coin value by the coin-selector.

6. A beverage dispensing machine according to claim 5, wherein an electromagnetic coin-block device is provided which only allows insertion of a coin into the machine when it is energised, the coin-block device being energised when the relay is operated and the first switch unoperated.

7. A beverage dispensing machine according to claim 6 comprising a drinking vessel dispenser operable by said coin selector the coin valve by the coin-selector causing a drinking vessel to be fed to a dispensing station by said dispenser.

8. A beverage dispensing machine according to claim 1, wherein a master container inlet control valve is included in said inlet duct, said valve blocking the flow of base medium through the container inlet duct to the container when the level of base medium in a waste can for excess base medium rises to a predetermined level.

9. A beverage dispensing machine according to claim 8, wherein said master container inlet control valve is further controlled by the height of a supply stack of drinking vessels, said valve blocking the flow of base medium through the container inlet duct when the stack of drinking vessels in the dispenser is reduced to a predetermined level.

10. A beverage dispensing machine according to claim 1 including a plurality of ingredient dispensing devices, and a selector switch, said dispensing devices being selectively operable by the setting of the selector switch by the consumer.

11. A beverage dispensing machine according to claim 10, wherein the ingredient dispensing devices are arranged above a common inclined mixing trough, the container outlet duct being disposed above one end of the mixing trough said trough having an outlet at the other end, a drinking vessel being placeable beneath outlet at the other end of the mixing trough.

12. A beverage dispensing machine according to claim 1, wherein a heater is provided in the container for heating base medium contained therein.

13. A liquid dispensing device for dispensing liquid ingredient in a beverage dispensing machine according to claim 1, wherein said ingredient-dispensing device comprises a trough to hold a quantity of liquid, a hollow non-magnetic valve body projecting downwardly from the bottom of the trough and having a liquid outlet at its lower end, a hollow magnetic valve vertically movable inside the valve body, said valve having a passage through its wall and sealing means below the passage cooperating with the lower part of the valve body when the valve is in its lowermost position in the valve body to prevent liquid in the valve escaping through the liquid outlet of the valve body but allowing such escape when the valve is raised in the valve body, the internal volume of the valve being substantially equal to the quantity of liquid to be dispensed at each actuation of the dispensing device, means to maintain the liquid level in the trough substantially constant, and a solenoid around the upper portion of the magnetic valve body for raising the valve when energized, the liquid level being such that the valve is submerged and filled when in its lowermost position and its upper edge is above the liquid level when in its raised position, whereby the quantity of liquid dispensed when the magnetic valve is raised by energisation of the solenoid is substantially equal to the volume contained within the valve.

14. A liquid dispensing device according to claim 13, wherein the means to maintain the liquid level in the trough substantially constant comprises a liquid container having an opening and supported in an inverted position with its opening at the desired height above the trough bottom, an airlock being formed by said inverted container to prevent flow of liquid from the liquid container when the liquid level in the trough rises to the level of the container opening.

References Cited in the file of this patent

UNITED STATES PATENTS

| | | |
|---|---|---|
| 1,031,187 | Larsen | July 2, 1912 |
| 1,772,545 | Hilty | Aug. 12, 1930 |
| 2,313,657 | Marshaus | Mar. 9, 1943 |
| 2,396,527 | Osborne | Mar. 12, 1946 |
| 2,565,084 | Parks | Aug. 21, 1951 |
| 2,712,887 | King | July 12, 1955 |
| 2,980,224 | Bookout et al. | Apr. 18, 1961 |

FOREIGN PATENTS

| | | |
|---|---|---|
| 83,204 | Denmark | July 29, 1957 |